June 4, 1940.  M. PANCORBO  2,203,543
RUBBER HEEL MOLD
Filed Nov. 10, 1938
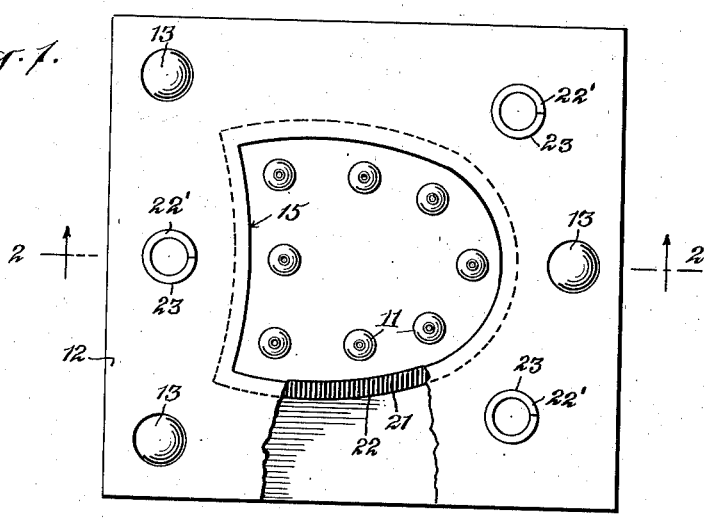
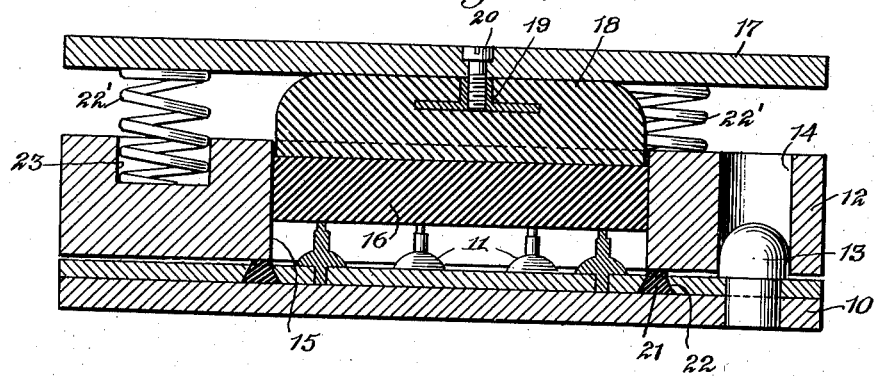
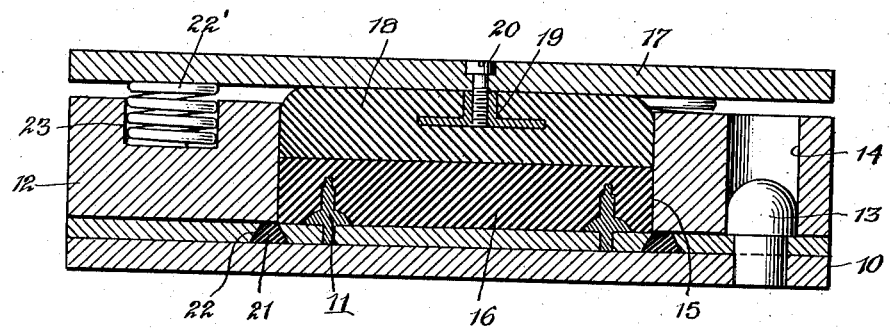
INVENTOR
Manuel Pancorbo
BY
Munn, Anderson & Liddy
ATTORNEYS Patented June 4, 1940

2,203,543

UNITED STATES PATENT OFFICE 2,203,543

RUBBER HEEL MOLD

Manuel Pancorbo, New York, N. Y.

Application November 10, 1938, Serial No. 239,736

1 Claim. (Cl. 18—42)

This invention relates to molds for rubber articles and while the invention has primarily to do with the manufacture of rubber heels and shall be hereinafter described in connection with the manufacture of rubber heels, it is obvious that the invention is broad enough to apply to any article which might be molded therein.

In the manufacture of rubber heels, as heretofore practiced, molds have been employed in which a block of uncured rubber is held under pressure in the mold and vulcanized while so held. The effect of molding as heretofore practiced is that the rubber heel under pressure in the vulcanizing operation is squeezed out at its edges and these edges or excess portions must be trimmed from the heel after it comes from the mold.

It is a broad purpose of my invention to provide a mold in which there will be no excess material to be trimmed off after the molding operation, and this desirable result is accomplished through the medium of the construction and arrangement of parts of the mold, all of which will be more fully hereinafter described and pointed out in the claim.

In the accompanying drawing—

Fig. 1 is a plan view of the mold with the top plate removed and a portion of the intermediate plate broken away;

Fig. 2 is a view in longitudinal section through the completed mold showing the initial position of the parts before pressure is applied;

Fig. 3 is a view similar to Fig. 2 showing the position of the parts after pressure has been applied and this view will also illustrate the completed mold operation.

My improved mold comprises three main parts, preferably of metal which, for convenience of description, we will term "plates." One of these plates 10 constitutes a base plate and may be made in sections or of a single integral member, as may be desired, and this base plate 10 is provided with shaping devices 11 projecting upwardly therefrom to give to the face of the heel the shape desired and, of course, these shaping devices are capable of a wide range of modification.

On the base plate 10 the intermediate plate 12 is adapted to be positioned and is guided and held in this position by means of studs 13 projecting upwardly from the base plate 10 and entering openings 14 in the intermediate plate 12. The intermediate plate 12 has an opening 15 providing the mold space for the heel indicated by reference character 16. The upper or top plate 17 of the mold has a head or plunger 18 fixed thereto and of a size slightly less than the size of the mold space 15 and adapted to enter said mold space and exert pressure on the heel 16. This head or plunger 18 is of vulcanized rubber or other analogous material so that when pressure is applied thereon, it will be caused to expand in the mold space and tightly and snugly fit said space to prevent any material of the heel from being squeezed upwardly around the edges of the head or plunger.

I have shown the plunger 18 as having a metal socket 19 anchored therein and receiving a screw 20 in the plate 17 to removably couple the head or plunger to the plate, so that these plungers may be replaced from time to time as may be necessary.

The base plate 10 is provided with a strip 21, at least partially embedded in the base plate 10 and of a size and shape to outline the mold space in the plate 12 and register with the inner surface of the mold space. This strip 21 is illustrated in a somewhat dovetailed shape in cross section located in a groove 22 in the upper face of the base plate of corresponding shape and it is to be understood that this strip 21 is of vulcanized rubber, or other analogous material, and normally extends slightly above the upper surface of the base plate so that when the mold sections are pressed together this strip 21 will be compressed and offer a tight seal to the lower edges of the mold space and prevent any rubber from being squeezed outwardly between the intermediate and the lower plate.

To insure the proper action of the mold I employ a series of coiled springs 22' which may be seated in sockets 23 in the upper face of the intermediate plate 12 and bear against the upper plate 17 so that when pressure is applied on the upper plate to force it toward the lower or base plate, these springs will immediately exert pressure on the intermediate plate 12 to tightly compress the sealing strip 21. At the same time the head or plunger 18 will be expanded to fit snugly within the mold space 15.

Fig. 2 illustrates the position of the parts with the uncured rubber block located in the mold space. Fig. 3 shows the position of parts when the mold is completely compressed and also when the molding operation is ended.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claim.

I claim:

A mold of the character described comprising a base plate, an intermediate plate and a top plate, said intermediate plate having an opening therein constituting a mold space and a seal of resilient material located in the base plate and engaged by the intermediate plate, said seal registering with the wall of the opening constituting the mold space in the intermediate member, and a resilient plunger on the upper plate adapted to enter the mold space and adapted to be expanded to fit the mold space when pressure is applied to the mold members and the article to be molded is in the mold space, and springs interposed between the upper plate and the intermediate plate so that when pressure is applied on the upper plate resilient pressure will be transmitted through to the intermediate plate to compress the seal in the base plate.

MANUEL PANCORBO.